United States Patent
Maynard et al.

(10) Patent No.: US 9,470,511 B2
(45) Date of Patent: Oct. 18, 2016

(54) POINT-TO-POINT MEASUREMENTS USING A HANDHELD DEVICE

(71) Applicant: Trimble Navigation Limited, Sunnyvale, CA (US)

(72) Inventors: Kurtis Maynard, Gainesville, GA (US); Gregory C. Best, San Francisco, CA (US); Robert Hanks, Fort Collins, CO (US); Hongbo Teng, Fremont, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 394 days.

(21) Appl. No.: 14/077,638

(22) Filed: Nov. 12, 2013

(65) Prior Publication Data
US 2015/0130928 A1  May 14, 2015

(51) Int. Cl.
*G01B 11/14* (2006.01)
*H04N 7/18* (2006.01)
*G01C 15/00* (2006.01)
*G06T 7/60* (2006.01)

(52) U.S. Cl.
CPC .......... *G01B 11/14* (2013.01); *G01C 15/002* (2013.01); *G06T 7/602* (2013.01); *H04N 7/18* (2013.01); *G06T 2207/10028* (2013.01)

(58) Field of Classification Search
CPC .......... G01B 11/14; G01C 15/002; G06T 2207/10028; G06T 7/602; H04N 7/18
USPC ........................................ 348/135
See application file for complete search history.

(56) References Cited

U.S. PATENT DOCUMENTS 5,699,444 A * 12/1997 Palm ............... G01C 11/06
                                                    348/42
8,229,166 B2  7/2012 Teng et al.
8,427,632 B1  4/2013 Nash et al.
(Continued)

FOREIGN PATENT DOCUMENTS

DE  10 2007 061384 A1  6/2009
DE     2007/061384 A1  6/2009
DE  10 2011 077854 A1  12/2012
DE     2011/077854 A1  12/2012
WO     2006/074290 A2  7/2006

OTHER PUBLICATIONS

International Search Report and Written Opinion for PCT/US2014/065240 mailed Jun. 29, 2015, 18 pages.
(Continued)

*Primary Examiner* — Francis G Geroleo
(74) *Attorney, Agent, or Firm* — Kilpatrick Townsend & Stockton LLP

(57) ABSTRACT

A method for performing point-to-point measurements includes (i) determining a distance to a first point and obtaining an image at a first pose, and (ii) determining a distance to a second point and obtaining an image at a second pose. The images have an overlapping portion. A change in pose between the first pose and the second pose is determined using observed changes between common features in the overlapping portion of the images and a scale associated with the images. A distance between the first point and the second point is determined based on the first distance, the second distance, and the change in pose between the first pose and the second pose.

14 Claims, 12 Drawing Sheets

(56) References Cited

U.S. PATENT DOCUMENTS

| | | | |
|---|---|---|---|
| 2006/0012777 A1 | 1/2006 | Talbot et al. | |
| 2007/0008515 A1 | 1/2007 | Otani et al. | |
| 2007/0052950 A1 | 3/2007 | Taylor et al. | |
| 2009/0222237 A1* | 9/2009 | Otani | G01C 1/04 702/152 |
| 2011/0243432 A1 | 10/2011 | Hirsch | |
| 2011/0288818 A1* | 11/2011 | Thierman | G01B 11/00 702/159 |
| 2012/0013736 A1* | 1/2012 | Graesser | G01C 15/06 348/135 |
| 2012/0163656 A1 | 6/2012 | Wang et al. | |
| 2012/0188529 A1 | 7/2012 | France | |
| 2012/0330601 A1 | 12/2012 | Soubra et al. | |
| 2014/0062772 A1* | 3/2014 | Jasiobedzki | G01S 17/023 342/357.28 |
| 2015/0109407 A1* | 4/2015 | Giger | G01S 17/023 348/36 |

OTHER PUBLICATIONS

Ti, "Total Station R-400 Series Instruction Manual," 2009, XP055167787, Chapter 10-RDM, retrieved from http://www.pentaxsurveying.com/en/pdfs/R400-MANUAL-PTL-EN.pdf. on Feb. 5, 2015, 144 pages.

Morgan, et al., "Aerial Mapping," In: Aerial Mapping, CRC Press LLC, 2002, XP055167782, ISBN: 978-1-56-670557-8, Chapter 6, para.6.2.1-6.2.2, Fig.6.1, 15 pages.

Invitation to Pay Additional Fees and, Where Applicable, Protest Fee from PCT/US2014/065240, mailed Feb. 23, 2015, 9 pages.

Ti, "Total Station R-400 Series, Instruction Manual," retrieved from http://www.pentaxsurveying.com/en/pdfs on Feb. 5, 2015, 144 Pages Morgan, et al. "Aerial Mapping," In: Aerial Mapping, CRC Press LLC, 2002, 15 pages.

* cited by examiner

POINT-TO-POINT MEASUREMENTS USING A HANDHELD DEVICE

FIELD OF THE INVENTION

Embodiments described herein relate generally to methods and apparatuses for measuring distances between points using a handheld device. The methods and apparatuses may be used in a number of applications, and are particularly useful in situations where it may be difficult to obtain position information, such as in indoor locations.

BACKGROUND

There are a number of ways of performing point-to-point measurements. As used herein, a point-to-point measurement is one that allows a distance to be determined between two remote points. A remote point is one that is located somewhere besides the position where a measurement device is located and from which a measurement is being performed. Using surveying as an example, a distance between two remote points may be determined by setting up a survey instrument, such as a total station, and measuring horizontal and vertical angles between two remote points and a distance from the survey instrument to each point. Using the measured angles and distances, the distance between the two remote points may be calculated using well known trigonometric techniques.

Performing point-to-point measurements using a handheld device are not as straightforward. Because a handheld device is not stationary, the location from which each distance is measured is likely different. Also, it is difficult to accurately determine angles between remote points using a handheld device. As a consequence, errors are introduced into the calculated distance. Thus, improved methods and apparatus are continually desired to reduce the error in point-to-point measurements using handheld devices.

SUMMARY

Embodiments described herein allow a person to accurately obtain distances between points without ever having to be physically present at the points. The distances may be obtained using a handheld device that makes acquisition of the distance information quick and simple. In an embodiment, for example, a user may obtain a distance between two remote points by simply aiming a handheld device at one of the points and pushing a button, and then aiming the handheld device at the other point and pushing the button. Pushing the button causes the handheld device to measure a distance and acquire an image. The handheld device may determine the distance between the points using the measured distances, overlapping portions of the acquired images, and a scale associated with the images. As described more fully below, the scale may be resolved automatically using information obtained from the images and may not require any additional inputs or actions by the user.

In accordance with an embodiment, a method for performing point-to-point measurements includes, at a first pose, determining a first distance to a first point using a distance measurement device and obtaining a first image using an imaging device. The method also includes, at a second pose, determining a second distance to a second point using the distance measurement device and obtaining a second image using the imaging device. The first image and the second image have an overlapping portion. A change in pose of the imaging device between the first pose and the second pose is determined using observed changes between common features in the overlapping portion of the first image and the second image and a scale associated with the first image and the second image. A distance between the first point and the second point is determined based on the first distance, the second distance, and the change in pose of the imaging device between the first pose and the second pose.

In an embodiment, at least one of the first image or the second image includes an object of known size that is used to resolve the scale.

In another embodiment, the method also includes determining a distance to a point that is captured in at least one of the first image or the second image and resolving the scale using the distance to the point.

In another embodiment, the method also includes projecting a known pattern of light onto an object that is captured in at least one of the first image or the second image. A distance to the object is determined using the known pattern of light in at least one of the first image or the second image. The scale is resolved using the distance to the object.

In another embodiment, the imaging device is a depth camera and the method also includes determining a distance to an object that is captured in at least one of the first image or the second image using the depth camera. The scale is resolved using the distance to the object.

In another embodiment, the method also includes determining a distance to an object that is captured in at least one of the first image or the second image using a location of focused radiation on the object and a known relationship between a field of view of the imaging device and the location of the focused radiation in the first image or the second image. The scale is resolved using the distance to the object.

In another embodiment, the method also includes, from a third pose, determining a third distance to a third point using the distance measurement device. The third point is located on a line extending between the first point and the second point. A third image is obtained using the imaging device, where the first image, the second image, and the third image have overlapping portions. The scale is resolved using observed changes between common features in the overlapping portions of the images and the first distance, the second distance, and the third distance.

In another embodiment, the first distance is determined concurrently with obtaining the first image, and the second distance is determined concurrently with obtaining the second image.

In yet another embodiment, a location of the first pose is different from a location of the second pose.

In some embodiments, the first image does not include the first point or the second image does not include the second point. In other embodiments, first image includes the first point or the second image includes the second point.

In accordance with another embodiment, a method for performing point-to-point measurements includes, at a first pose, determining a first distance to a first point using a distance measurement device and obtaining a first image using an imaging device. The method also includes, at a second pose, determining a second distance to a second point using the distance measurement device and obtaining a second image using the imaging device. The method also includes, from each of one or more additional poses, obtaining an additional image using the imaging device to provide one or more additional images. A portion of at least one of the one or more additional images overlaps with the first image, a portion of at least one of the one or more additional images overlaps with the second image, and if there is more than one additional image, each additional image overlaps with others of the one or more additional images. Changes in pose of the imaging device between each of the poses is determined using observed changes between common features in overlapping portions of the first image, the second image, and the one or more additional images and a scale associated with first image, the second image, and one of the one or more additional images. A distance between the first point and the second point is determined based on the first distance, the second distance, and the changes in pose of the imaging device between each of the poses.

In accordance with yet another embodiment, an apparatus for performing point-to-point measurements includes a distance measurement device configured to acquire distance information, an imaging device configured to acquire image information, and a processor. The processor is configured to receive the distance information and receive the image information. The distance information includes a first distance to a first point and a second distance to a second point. The image information includes a first image obtained at the first pose and a second image obtained at the second pose. The first image and the second image have an overlapping portion. The processor is also configured to determine a change in pose of the imaging device between the first pose and the second pose using observed changes between common features in the overlapping portion of the first image and the second image and a scale associated with the first image and the second image. The processor is also configured to determine a distance between the first point and the second point based on the first distance, the second distance, and the change in pose of the imaging device between the first pose and the second pose.

In an embodiment, the distance measurement device is an electronic distance meter (EDM).

In another embodiment, the imaging device is a digital camera.

Numerous benefits are achieved using embodiments described herein over conventional techniques. For example, some embodiments provide methods for performing real-time point-to-point measurements using a handheld device. A heavy or cumbersome device is not required. Instead, the handheld device may be compact so that it can be easily carried in a user's hand or stored in a pocket. Also, the handheld device may be integrated with another electronic device such as a smartphone or a laser pointer. This allows a user to perform point-to-point measurements using a standard electronic device that is normally carried by the user to perform other functions. Further, a tripod is not required and the handheld device does not have to be held stationary. Depending on the embodiment, one or more of these benefits may exist. These and other benefits are described throughout the specification.

DETAILED DESCRIPTION

Embodiments described herein provide methods and apparatuses for performing point-to-point measurements using a handheld device. The handheld device may include a distance measurement device configured to acquire distance information, an imaging device configured to acquire image information, and a processor configured to receive the distance and image information and use it to determine distances between remote points.

Merely by way of example, in an embodiment a user may obtain a distance between two remote points by simply aiming the handheld device at one of the points and pushing a button, and then aiming the handheld device at the other point and pushing the button. Pushing the button may cause the handheld device to measure a distance using the distance measurement device and acquire an image using the imaging device. The handheld device may be aimed at the points using any of a number of different techniques, such as using a spotting laser aligned with the measurement device, using a viewfinder with crosshairs aligned with the measurement device, and the like. A processor, either within the handheld device or remote from the handheld device, may be adapted to determine the distance between the points using the measured distances, overlapping portions of the acquired images, and a scale associated with the images.

Although there are many ways to resolve the scale associated with the images, in an embodiment the scale is resolved using an object of known size that is included in at least one of the acquired images. The scale provides a means for determining a magnitude of translation between the positions from where the images were acquired. The translation may be determined in pixels using the images, and the scale allows the translation in pixels to be converted into units of distance.

Figure 1:
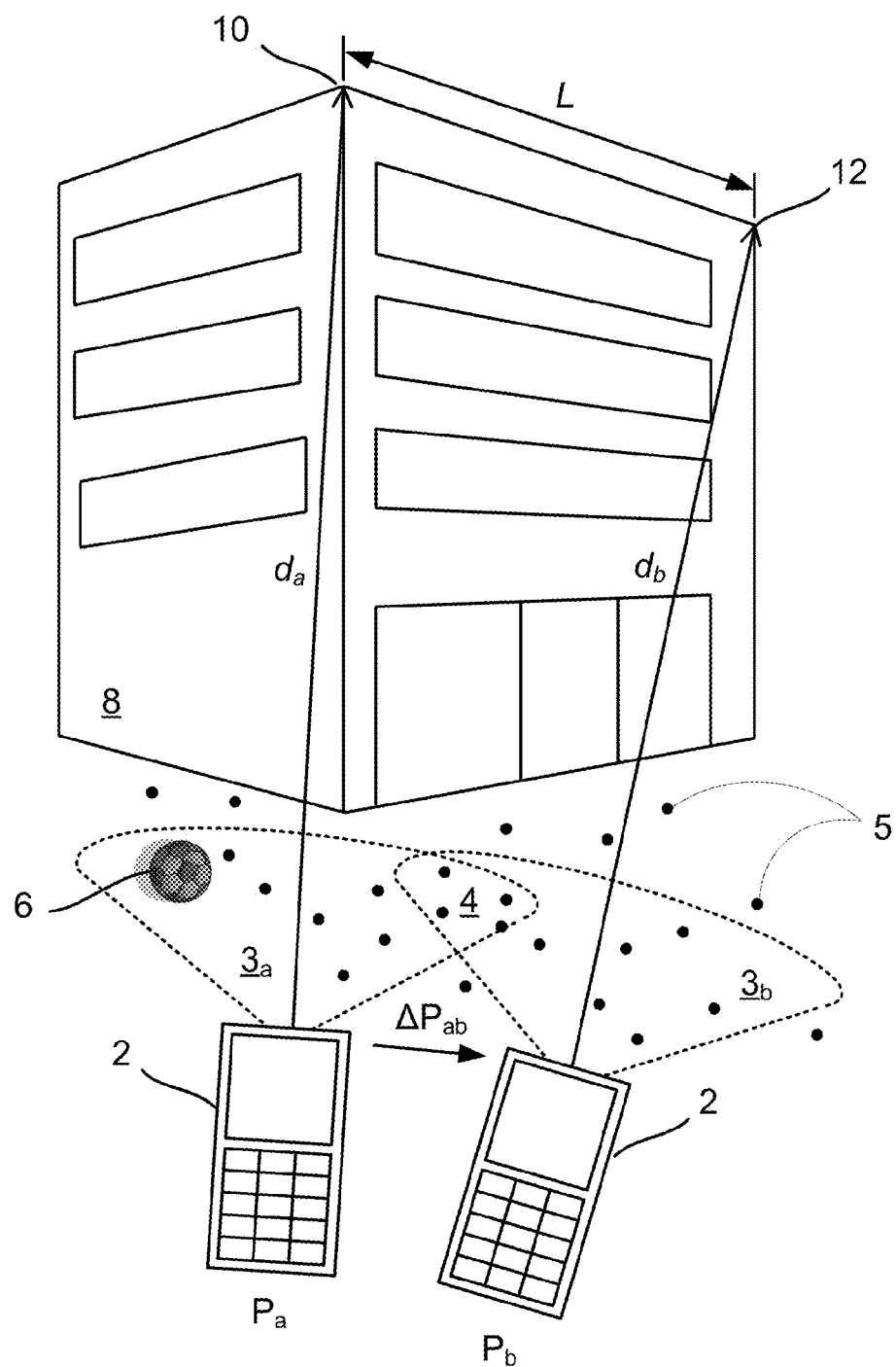
FIGS. 1-2 are simplified diagrams illustrating methods of performing point-to-point measurements using a handheld device in accordance with some embodiments.

FIG. 1 is a simplified diagram illustrating a method of performing point-to-point measurements using a handheld device in accordance with an embodiment. In this example, a handheld device 2 is used to determine a distance L between two points 10, 12 located at top corners of a building 8. The distance L is a length of the building 8 in this case. Embodiments may also be used to determine the height, width, or any other dimension of the building 8 (or of any other object or the distance between objects).

The handheld device 2 performs a first measurement at a first pose $P_a$ and a second measurement at a second pose $P_b$. Because it is handheld, the device 2 will most likely have a different pose between the first and second poses $P_a$, $P_b$. As used herein, pose refers to a position and orientation of the imaging device with respect to surrounding objects in a field of view (or a position and orientation of the handheld device 2 if the imaging device is coupled to or integrated with the handheld device 2 in a fixed position). In FIG. 1, the change in pose between the first pose $P_a$ and the second pose $P_b$ is represented as $\Delta P_{ab}$. The methods described herein are applicable even if there is no change in orientation and/or translation between the first and second poses $P_a$, $P_b$.

Performing the first measurement includes measuring a first distance $d_a$ to a top corner 10 of the building 8 and obtaining a first image having a field of view $3_a$. Performing the second measurement includes measuring a second distance $d_b$ to a top corner 12 of the building 8 and obtaining a second image having a field of view $3_b$. The steps of measuring the distance and obtaining the image may be performed concurrently. This reduces measurement time and increases accuracy. Measurement time is reduced because the operations are performed at the same time (rather than sequentially). Accuracy is increased because the image and the distance are obtained with the handheld device 2 in the same pose.

The first and second distances $d_a$, $d_b$ may be measured using a distance measurement device such as an electronic distance meter (EDM). As used herein, an EDM is not limited to any particular measurement technology or technique and may use known methods that utilize sonar, radar, microwave, infrared, laser, or the like. The first and second images are obtained using an imaging device such as a digital camera, a digital video camera, a digital camcorder, a digital stereo camera, a depth camera, or the like.

In this example, there are a number of features 5 that are included within the fields of view $3_a$, $3_b$ of the first and second images, including some common features that that are located in an overlapping portion 4 of both images. The features 5 are points and/or structures that may be detected by a feature tracking technique. Each feature may include a point, region, contour, texture, or the like. Although not specifically identified in FIG. 1, the object 6 and the building 8 may also include a number of features that that can be detected by a feature tracking technique. For example, corners of buildings and windows are features that can usually be easily detected.

Using observed changes between common features 5 in the overlapping portion 4 of the images, a change in pose $\Delta P_{ab}$ of the imaging device between the first pose $P_a$ and the second pose $P_b$ may be determined using known feature tracking and pose determination techniques. Merely by way of example, the change in pose $\Delta P_{ab}$ may be determined using an image-based positioning technique that involves solving for three-dimensional (3D) motion of the imaging device. Such techniques typically derive motion of the imaging device by solving the inverse-projection of transformations detected in features of an image from a two-dimensional (2D) image plane into an estimate of the 3D motion. The technique may involve (i) processing images to track locations of one or more common features, (ii) obtaining sets of two-dimensional position fixes for each of the one or more common features, (iii) providing sets of tracking data for each of the one or more common features, and (iv) determining a change in feature-based coordinates using the sets of tracking data. Further details are provided in U.S. Patent Publication No. 2012/0163656, filed Jun. 24, 2011. The change in pose $\Delta P_{ab}$ may also be determined using an image tracking technique as described in U.S. Pat. No. 8,229,166, issued Jul. 24, 2012. As another example, the change in pose $\Delta P_{ab}$ may be determined using a matchmove technique as described in U.S. Patent Publication No. 2012/0330601, filed Feb. 15, 2012. The contents of each of these references are incorporated herein by reference in their entirety for all purposes. Other similar techniques, such as simultaneous localization and mapping (SLAM) techniques or optical flow techniques, may also be used.

These feature tracking and pose determination techniques may be used to determine a change in orientation (e.g., a change in yaw, pitch, and roll) and a change in translation (e.g., a change in X, Y, Z) between the first pose $P_a$ and the second pose $P_b$. The change in translation may be determined in number of pixels. Additional information may be needed to resolve the scale for translation (or determine units of distance for the translation). Several methods for acquiring the additional information and resolving the scale are described throughout the specification for completeness (see, for example, the description associated with FIGS. 4-5), but other methods may be used and embodiments should not be limited only to the methods described herein.

In the example shown in FIG. 1, the scale is resolved using the object 6 that is within the field of view $3_a$ and hence within the first image acquired from the first pose $P_a$. Although the object 6 is only included with in the field of view $3_a$ of the first image, it may be included in one or more of the images (or in the overlapping portion of the images). In this case, the object 6 has a known size that provides a means for resolving the scale associated with the images in accordance with known techniques. Although the object 6 is a soccer ball in this example, the object 6 may be anything such as a fire hydrant, window, target, ruler, scale, or the like that has a known size. The known size can be used to convert a translation of the imaging device in image pixels to a translation in units of distance. For example, the images can be used to construct a three-dimensional representation of the scene with relative depth information, and the known size of the object 6 can be used to resolve the scale for converting the relative information into units of distance.

The change in pose $\Delta P_{ab}$ and the measured distances $d_a$, $d_b$ provide a traverse network that may be used to determine the distance L between the points 10, 12. Further details are provided below with regard to FIGS. 3A-3D.

The handheld device 2 may include one or more processors adapted to determine the change in pose $\Delta P_{ab}$ in accordance with a known feature tracking and pose determination technique. The processor(s) may also be adapted to determine the distance L using the change in pose $\Delta P_{ab}$ and the measured distances $d_a$, $d_b$. Alternatively, the processor(s) may be located in a separate computing device that receives the distance and/or image information and determines the change in pose $\Delta P_{ab}$ and distance L. The methods described herein may be implemented using a general purpose processor or an application specific processor (ASIC, FPGA, PLD, etc.). The handheld device 2 may also include memory adapted to store computer-readable instructions for implementing the methods.

In the example shown in FIG. 1, the fields of view $3_a$, $3_b$ of the first and second images do not include the remote points 10, 12. Instead, the imaging device is pointed downward and somewhat forward so that the fields of view $3_a$, $3_b$ cover portions of the ground in front of the handheld device 2. This is merely one example, and other examples will be described where the imaging device is pointed differently. For example, in FIG. 2 the imaging device is pointed in a direction similar to that of the measurement device so that the fields of view do include the remote points. Other alternatives are possible.

Since common features in overlapping portions of the images are used to determine a change in pose between measurements, the imaging device may be pointed in a direction such that an adequate number and quality of features are captured within the field of view, particularly within the overlapping portions. This will likely be application and possibly even measurement dependent. To accommodate different measurement situations, in some embodiments the direction that the imaging device is pointing in relation to the handheld device may be adjustable between different fixed positions. One fixed position (e.g., pointing downward) may be used to measure a distance between one set of points, and another fixed position (e.g., pointing forward) may be used to measure a distance between another set of points.

Figure 2:
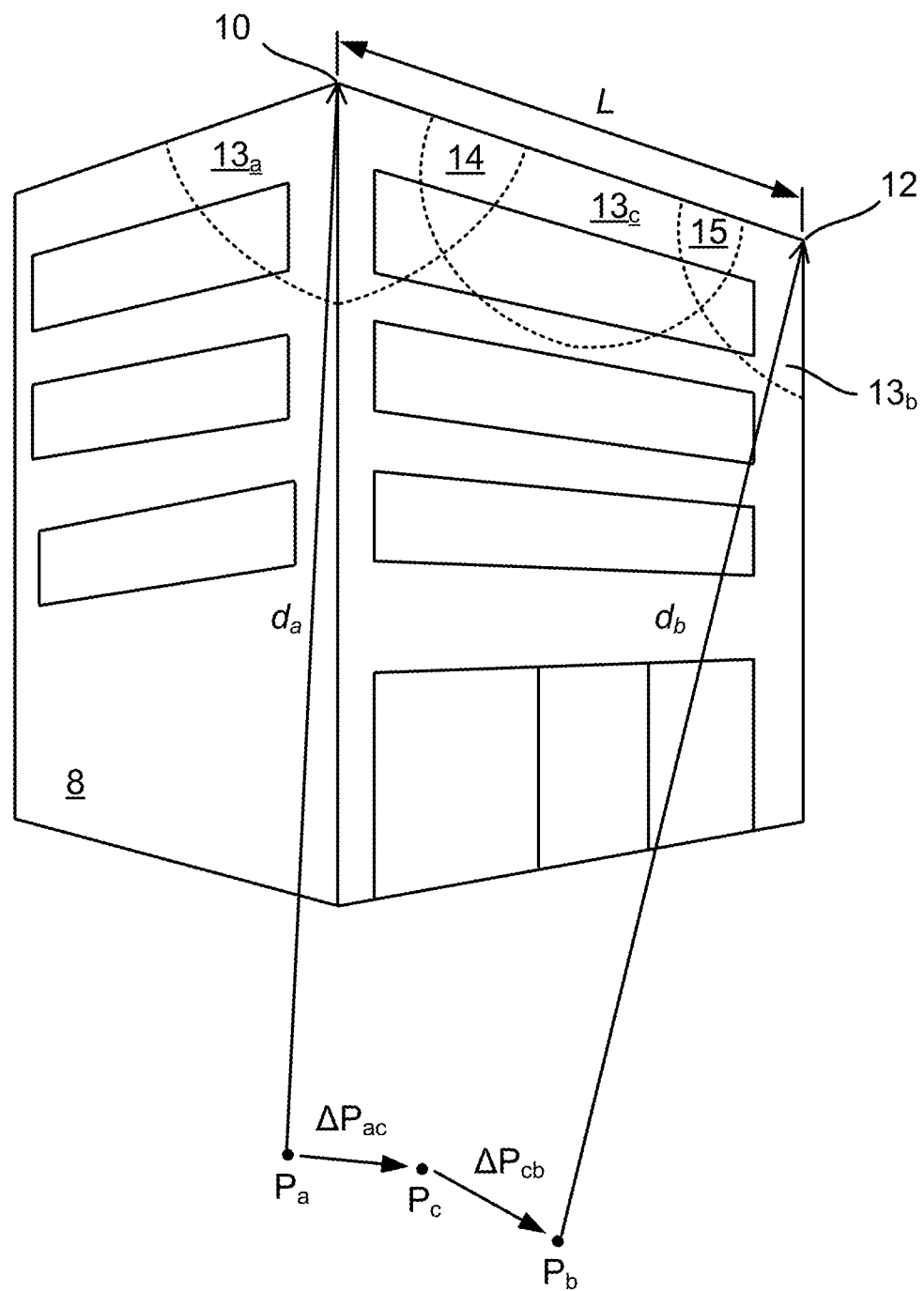

FIG. 2 is a simplified diagram illustrating a method of performing point-to-point measurements using a handheld device in accordance with another embodiment. The handheld device has been omitted from this figure to avoid unnecessary clutter, but the poses $P_a$, $P_b$, $P_c$ at which the different measurements are performed in this example are represented. This example is similar to FIG. 1 in that it illustrates a method of determining the distance L between the points 10, 12. This example is different from FIG. 1 in that the imaging device is pointed in a direction similar to that of the measurement device so that the images include the points 10, 12. This is shown by fields of view $13_a$, $13_b$. Also, in this example the fields of view $13_a$, $13_b$ do not overlap, so a third image is acquired that overlaps with the other images. This is shown by field of view $13_c$ and overlapping portions 14, 15. Observed changes between common features in the overlapping portions of the images may be used to determine changes in pose of the imaging device between the measurement poses $P_a$, $P_b$, $P_c$.

In this example, the handheld device performs a first measurement at a first pose $P_a$, a second measurement at a second pose $P_b$, and a third measurement at a third pose $P_c$. The measurements may be performed in any order, and the notations first, second, third, as well as a, b, c, are used only for convenience. Performing the first measurement includes measuring a first distance $d_a$ to a top corner 10 of the building 8 using a distance measurement device and obtaining a first image having a field of view $13_a$ using an imaging device. Performing the second measurement includes measuring a second distance $d_b$ to a top corner 12 of the building 8 using the distance measurement device and obtaining a second image having a field of view $13_b$ using the imaging device. The steps of measuring the distance and obtaining the image may be performed concurrently. Performing the third measurement includes obtaining a third image having a field of view $13_c$ using the imaging device. A third distance may or may not be performed from the third pose $P_c$ (in this example a third distance is not measured).

Although not specifically shown in this figure, there are a number of features that are included within the fields of view $13_a$, $13_b$, $13_c$ of the first, second, and third images, including some common features that that are located in the overlapping portions 14, 15. Using observed changes between common features in the overlapping portions 14, 15 of the images, the changes in pose $\Delta P_{ac}$ and $\Delta P_{cb}$ may be determined using known feature tracking and pose determination techniques. Like the example of FIG. 1, additional information may be needed to resolve the scale associated with the images to obtain the translation in units of distance. The changes in pose $\Delta P_{ac}$ and $\Delta P_{cb}$ and the measured distances $d_a$, $d_b$ provide a traverse network that may be used to determine the distance L between the points 10, 12.

The method illustrated in FIG. 2 may be extended to situations where any number of images are obtained between a first pose where a first distance to a first remote point is measured and a second pose where a second distance to a second remote point is measured. A viewfinder may be used to ensure that adjacent images overlap or the feature tracking and pose determination technique may provide signals indicating a number and quality of common features between images. Changes in pose between each of the overlapping images may be determined and used in determining the distance between the remote points. Also, the examples provided in FIGS. 1 and 2 are not intended to be mutually exclusive. The example of FIG. 1 may include a series overlapping images like that shown in FIG. 2. Similarly, the example of FIG. 2 may include only two overlapping images like that shown in FIG. 1. This depends, for example, on the measured distanced, the distance between the remote points, the pointing direction, the field of view of the imaging device, and the like.

Figure 3A:
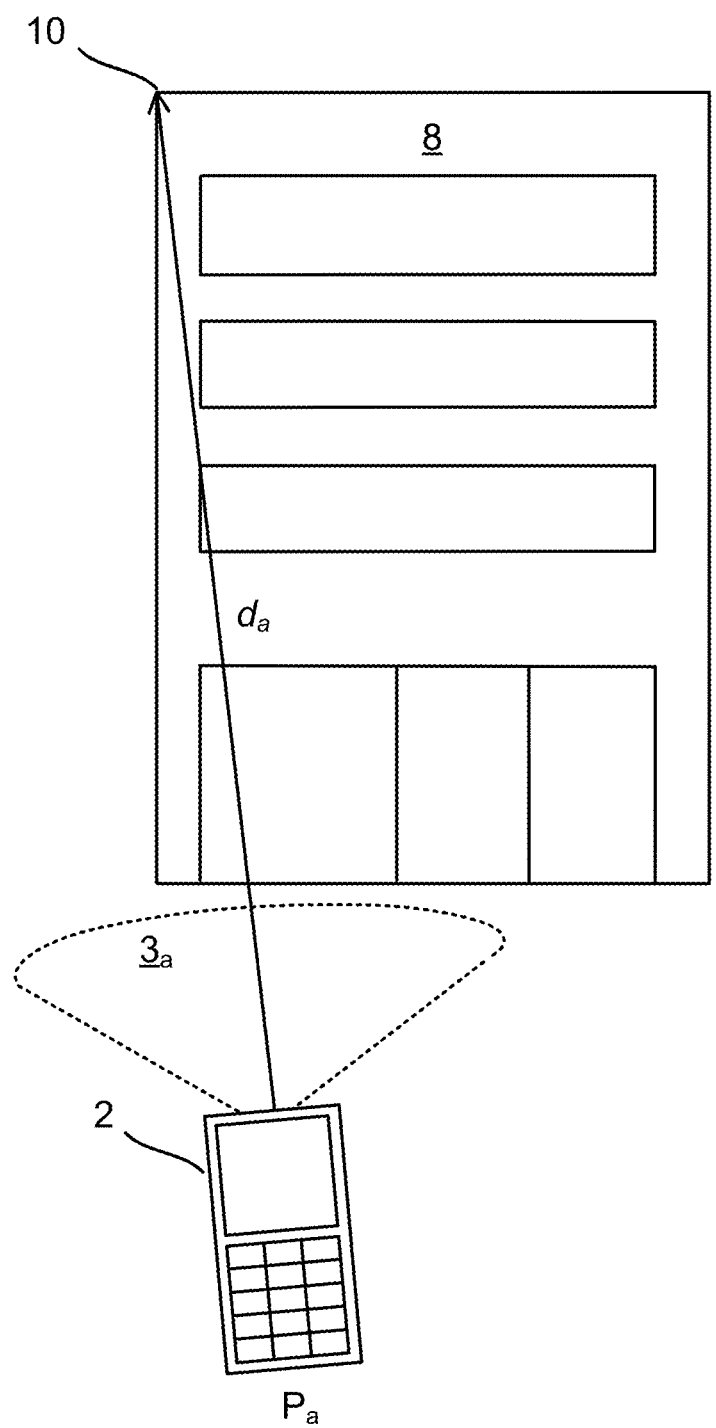
FIGS. 3A-3D are simplified diagrams illustrating the steps for performing point-to-point measurements in accordance with an embodiment.

FIGS. 3A-3D are simplified diagrams illustrating the steps for performing point-to-point measurements in accordance with an embodiment. This example is similar to that of FIG. 1, but the drawings are intended to illustrate the different steps in determining the distance between two remote points. In FIG. 3A, the handheld device 2 performs a first measurement from a first pose $P_a$. Performing the first measurement includes measuring a first distance $d_a$ to a top corner 10 of the building 8 and obtaining a first image having a field of view $3_a$. The steps of measuring the distance and obtaining the image may be performed concurrently.

Figure 3B:
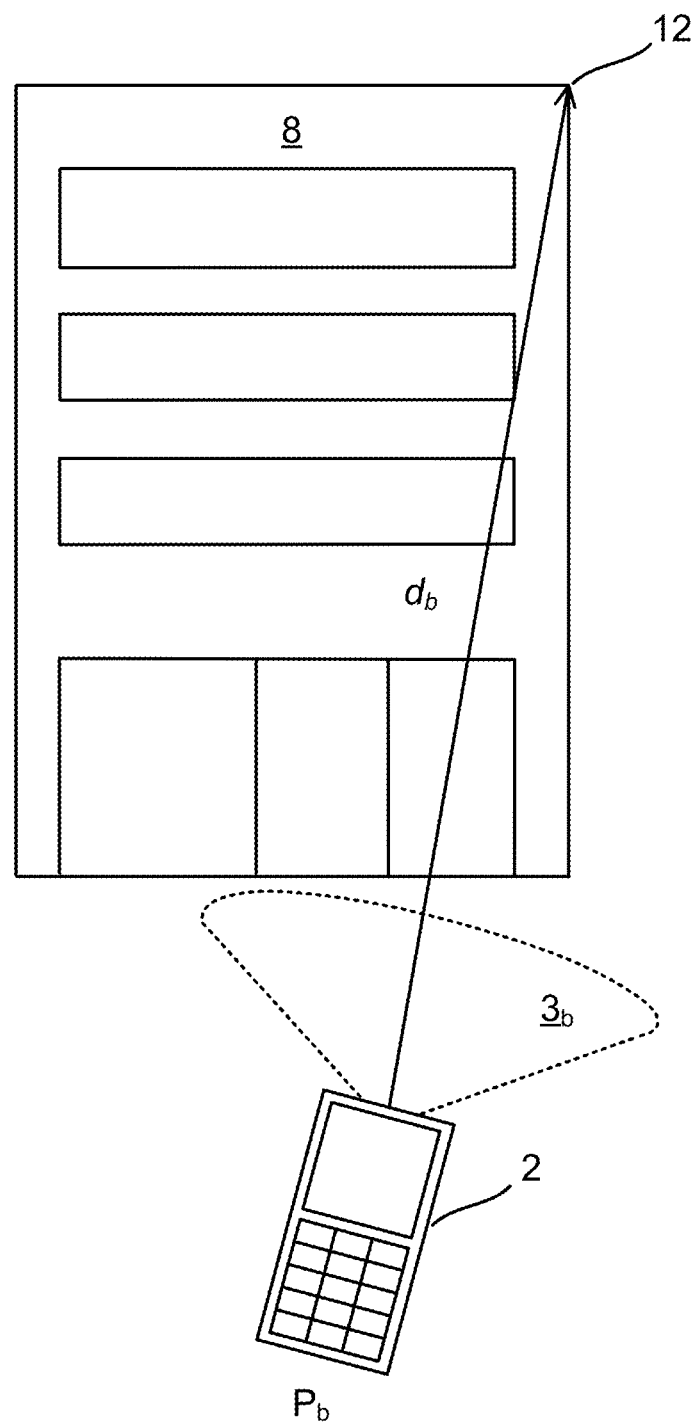

In FIG. 3B, the handheld device 2 performs a second measurement from a second pose $P_b$. Performing the second measurement includes measuring a second distance $d_b$ to a top corner 12 of the building 8 and obtaining a first image having a field of view $3_b$. The steps of measuring the distance and obtaining the image may be performed concurrently. Although not shown in this step-by-step illustration, the images overlap, and the overlapping portion includes common features that may be used in determining the change in pose $\Delta P_{ab}$ of the imaging device between the two poses $P_a$, $P_b$.

Figure 3C:
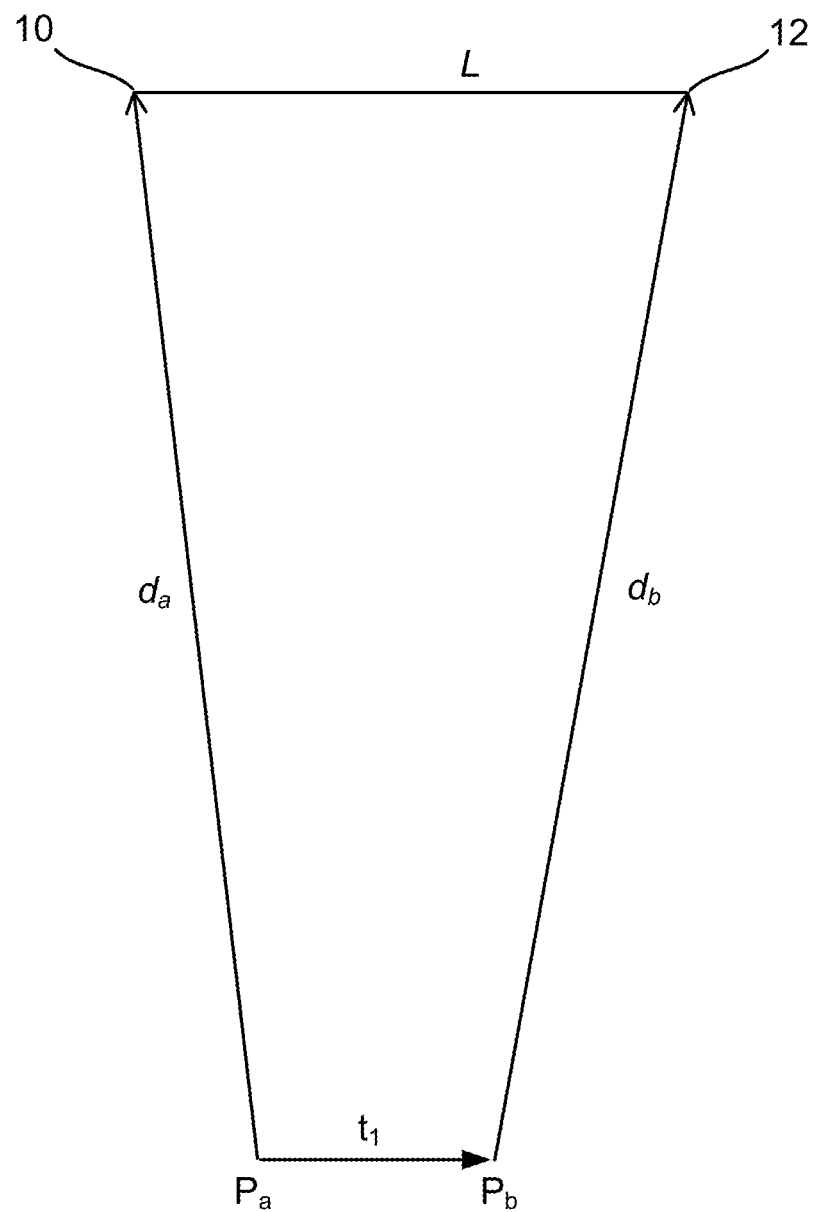
Figure 3D:
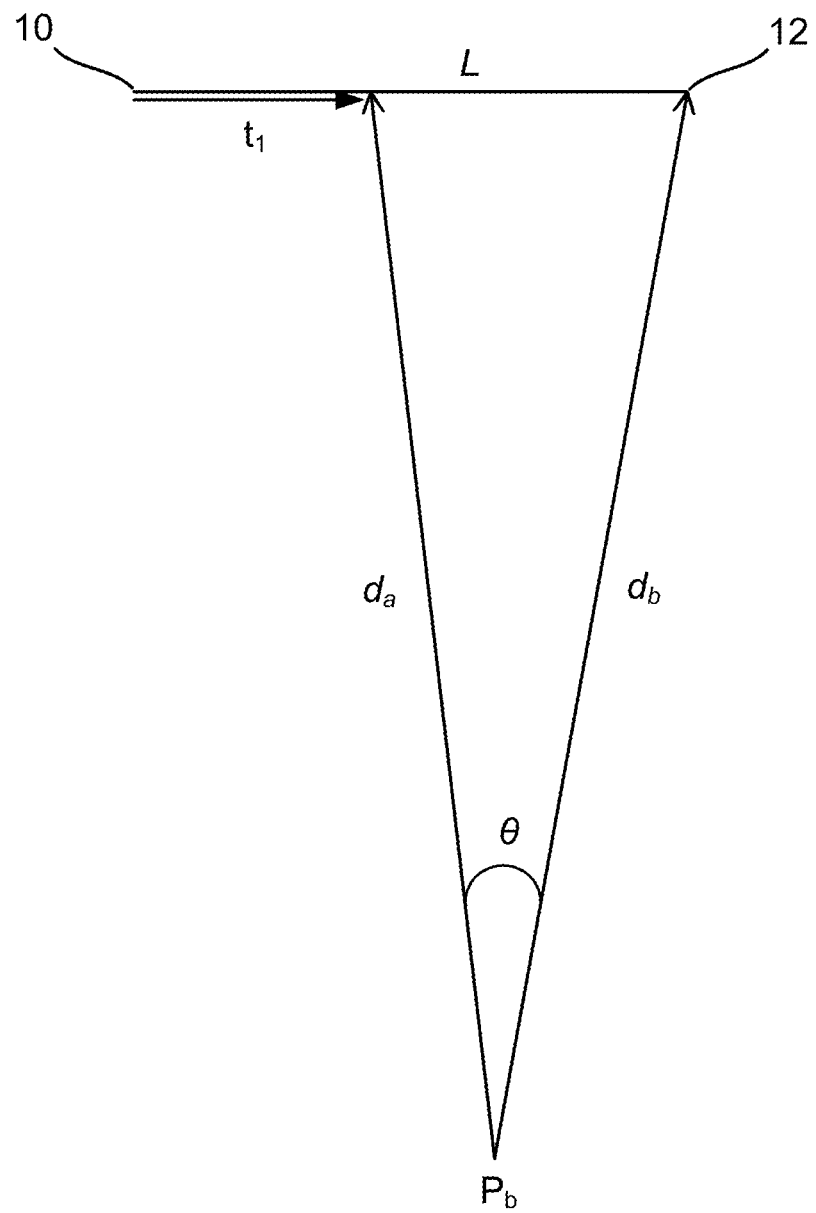

FIG. 3C shows the distances $d_a$, $d_b$, the translation $t_1$ between the two poses $P_a$, $P_b$, and the distance L between the two points 10, 12. Not shown in this figure is an angle of rotation θ between the two poses $P_a$, $P_b$. The change in pose $\Delta P_{ab}$ (including the translation $t_1$ and rotation θ) may be determined using a feature tracking and pose determination technique as described above with regard to FIGS. 1-2. Like the previous examples, additional information may be needed to resolve the scale of the images so that a magnitude (or units of distance) of the translation $t_1$ can be determined. FIG. 3D shows the angle of rotation θ between the two poses $P_a$, $P_b$. This figure also illustrates that the measured distances $d_a$, $d_b$, the translation $t_1$, and the rotation θ in this example provide a simple traverse network that can be used to determine the distance L between the remote points 10, 12 using the equation:

$$L = t_1 + d_a^2 + d_b^2 - 2d_a d_b (\cos \theta)$$

Some real-world applications may provide a more complex traverse network that can be used to determine the distance L in accordance with known surveying techniques.

Although the location and orientation of the handheld device 2 in this example changes between the first pose $P_a$ and the second pose $P_b$, the handheld device 2 may be in the same location and/or have the same orientation at each pose in some embodiments.

Figure 4:
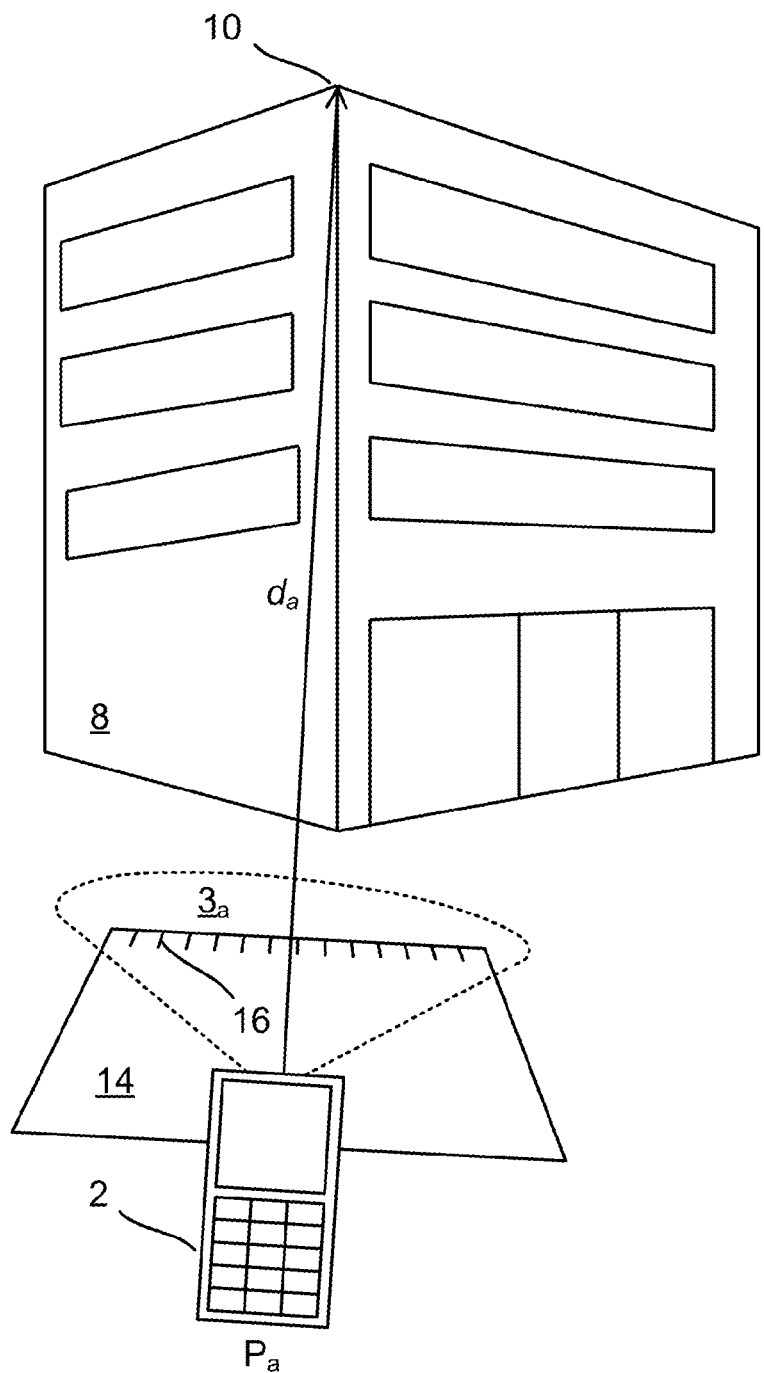
FIGS. 4-5 are simplified diagrams illustrating methods for resolving a scale associated with overlapping images in accordance with some embodiments.

FIG. 4 is a simplified diagram illustrating a method for resolving a scale associated with overlapping images in accordance with an embodiment. This figure does not illustrate all of the steps for performing point-to-point measurements like FIGS. 1, 2, and 3A-3C, but instead illustrates only a single step for resolving the scale. This step may be performed separately or in conjunction with one of the steps described in the previous figures. For example, this figure shows a handheld device 2 at a pose $P_a$ that is measuring the distance $d_a$ the top corner 10 of the building 8 and acquiring an image having a field of view $3_a$. This is similar to the step illustrated in FIG. 3A, and the step illustrated in FIG. 4 may be performed concurrently with the measurement step of FIG. 3A. In this example, a mat 14 with lines 16 having a known length and/or having known spacing between them is within the field of view $3_a$ of the image and may be used to resolve the scale associated with the images. This is similar to the object 6 of known size used in the example of FIG. 1. The lines 16 provides a means for resolving the scale associated with the overlapping images (the one or more additional images are omitted from this figure to reduce unnecessary clutter).

Figure 5:
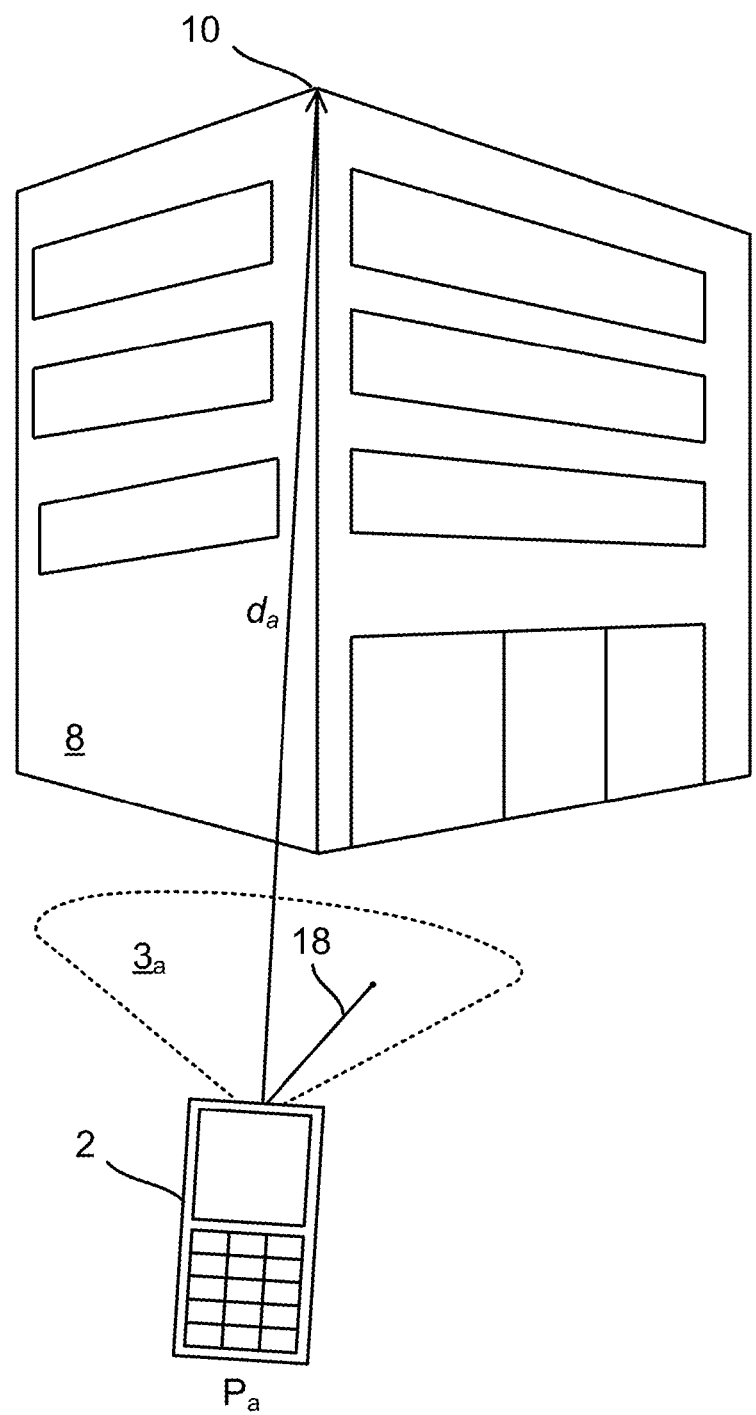

FIG. 5 is a simplified diagram illustrating a method for resolving a scale associated overlapping images in accordance with another embodiment. Like FIG. 4, this figure does not illustrate all of the steps for performing point-to-point measurements, but instead illustrates only a single step that may be used for resolving the scale. In this example, focused radiation 18 (e.g., a laser beam) is projected onto an object or surface that is within the field of view $3_a$ of an image. The radiation source and the imaging device are calibrated to provide a known relationship between the field of view $3_a$ of the imaging device and the location of the focused radiation 18 in the image as it impinges on the object or surface. This allows a distance to the object or surface in the image to be determined as more fully explained in U.S. Pat. No. 8,427,632, issued Apr. 23, 2013, which is incorporated herein by reference in its entirety for all purposes. The distance to the object may be used to resolve the scale associated with the overlapping images (the one or more additional images are omitted from this figure). Like the object of known size in FIG. 1 and the mat having lines of known size or spacing in FIG. 4, the distance to the object may be used to resolve the scale for converting relative information into units of distance.

There are a number of other methods that may be used to determine a distance to a point or object in an image (e.g., using the same or a different distance measurement device as that used to measure the distance to the remote points; using a depth camera; using known structured light methods that include projecting a known pattern of light onto an object, capturing the pattern of light in an image, and determining a distance to the object based on the pattern in the image; and the like). The distance determined from these or other methods may be used to resolve the scale associated with the images that are used to determine the changes in pose between the different measurement positions.

Figure 6:
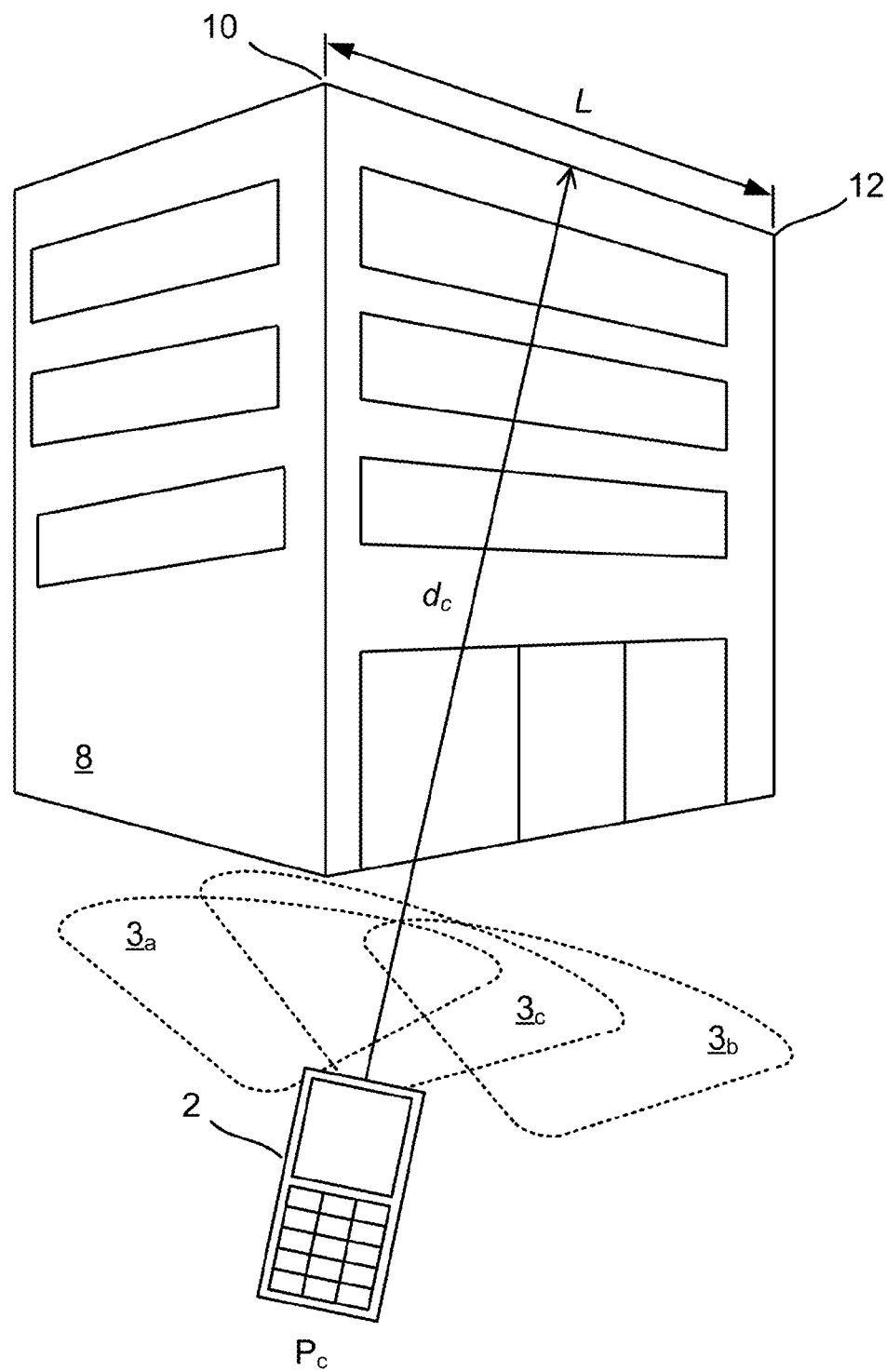
FIG. 6 is a simplified diagram illustrating a method of performing point-to-point measurements in accordance with an embodiment.

FIG. 6 is a simplified diagram illustrating a method of performing point-to-point measurements in accordance with an embodiment. This figure shows a handheld device 2 at a pose $P_c$. The handheld device 2 is measuring a distance $d_c$ to a point along the top edge of the building 8 and acquiring an image having a field of view $3_c$. The point along the top edge of the building is on a line between the points 10, 12. This figure also shows fields of view $3_a$, $3_b$ from images that were acquired previously or that will be acquired subsequently. Not shown are the poses associated with the fields of view $3_a$, $3_b$ and the measured distanced to the points 10, 12. This example provides three measured distances (from a first pose to the first point 10 (not shown), from a second pose to the second point 12 (not shown), and from the third pose $P_c$ to a point on the line between the points 10, 12). This example also provides three overlapping images (a first image having a first field of view $3_a$, a second image having a second field of view $3_b$, and a third image having a third field of view 30. Because the measured distances are each to points on the same line, an overdetermined system is provided from which the changes in pose between the measurement positions can be determined and the scale associated with the images resolved. Using the changes in pose and the measured distances, the distance L between the points 10, 12 may be determined as described previously.

Figure 7:
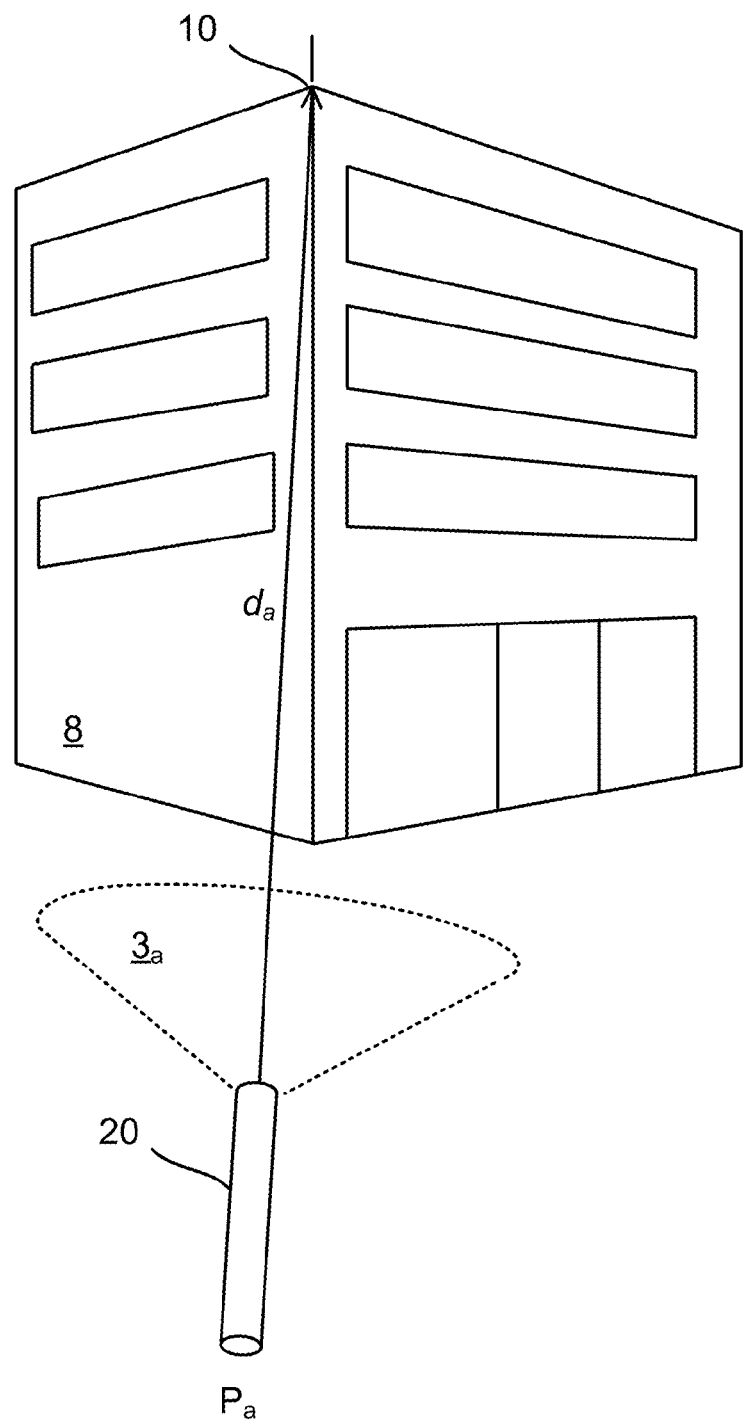
FIG. 7 is a simplified diagram illustrating a method of performing point-to-point measurements using a laser pointer device in accordance with an embodiment.

FIG. 7 is a simplified diagram illustrating a method of performing point-to-point measurements using a laser pointer device 20 in accordance with an embodiment. This figure provides an example of another common device (i.e., a laser pointer) that may be configured to perform point-to-point measurements using any of the methods described herein. Like the handheld device 2 shown in the previous figures, the laser pointer device 20 includes a distance measurement device configured to measure the distance to remote points and an imaging device configured to acquire images. Although not shown in this example, the laser pointer device 20 also includes a processor for performing the methods described herein.

Figure 8:
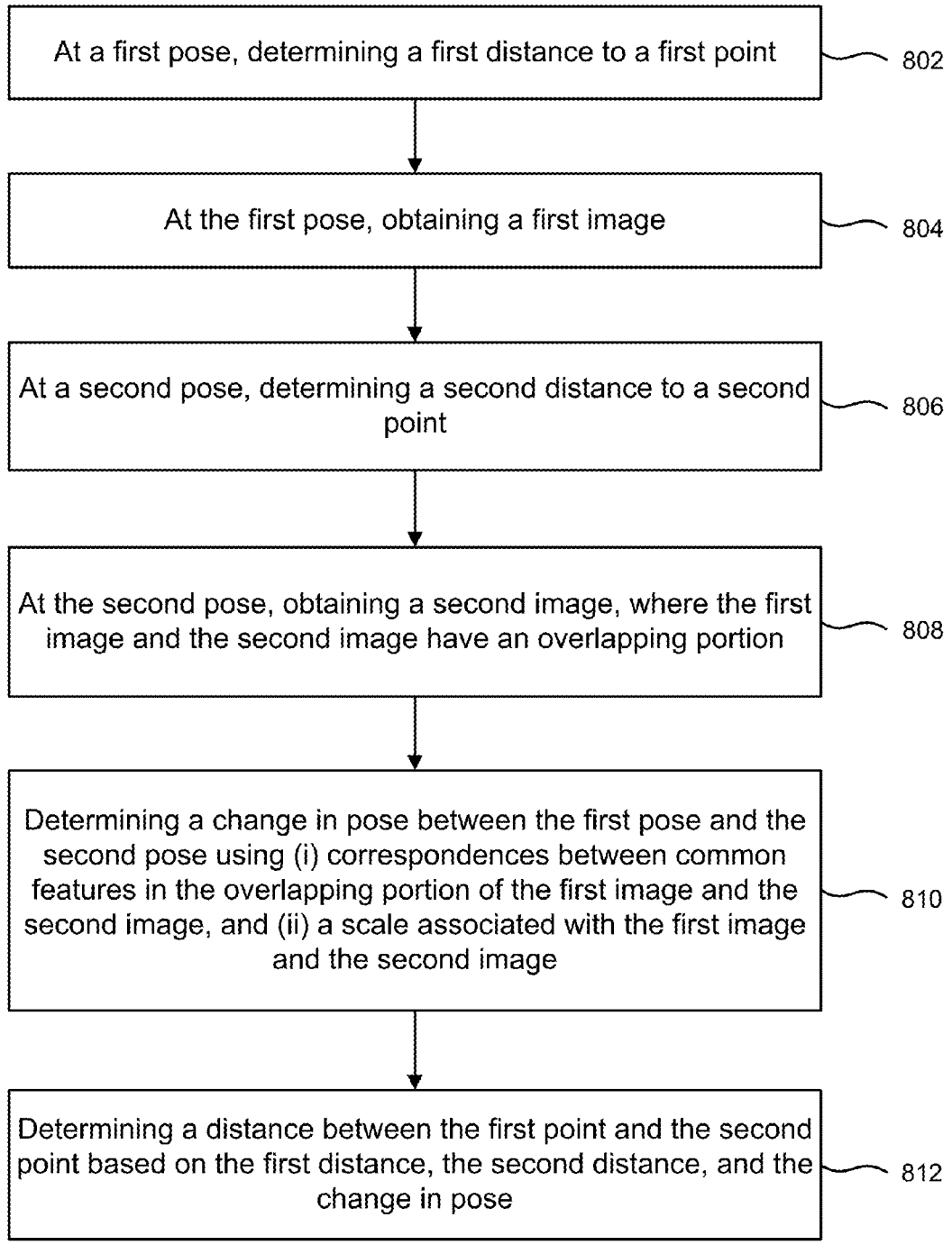
FIGS. 8-9 are flowcharts providing methods of performing point-to-point measurements in accordance some embodiments.

FIG. 8 is a flowchart providing a method for performing point-to-point measurements in accordance an embodiment. The method includes determining a first distance to a first point at a first pose (802). The distance may be determined using a distance measurement device such as an EDM. A first image is obtained at the first pose (804). The image may be obtained using an imaging device such as a digital camera. Determining the first distance may be performed concurrently with obtaining the first image. A second distance to a second point is determined at a second pose (806). The second point may be different from the first point. A second image is obtained at the second pose, where the first image and the second image have an overlapping portion (808). A change in pose between the first pose and the second pose is determined using (i) observed changes between common features in the overlapping portion of the first image and the second image, and (ii) a scale associated with the images (810). The change in pose may be determined using a known feature tracking and pose determination technique. The scale may be resolved using an object or known size in at least one of the images, using lines having a known length or spacing in at least one of the images, using a distance to a point in at least one of the images, using a third distance measurement to a line between the first and second points and a third image, or any other technique. A distance between the first point and the second point is determined based on the first distance, the second distance, and the change in pose (812). These first and second distances and the change in pose provide a traverse network that can be used to determine the distance between the first and second points.

Figure 9:
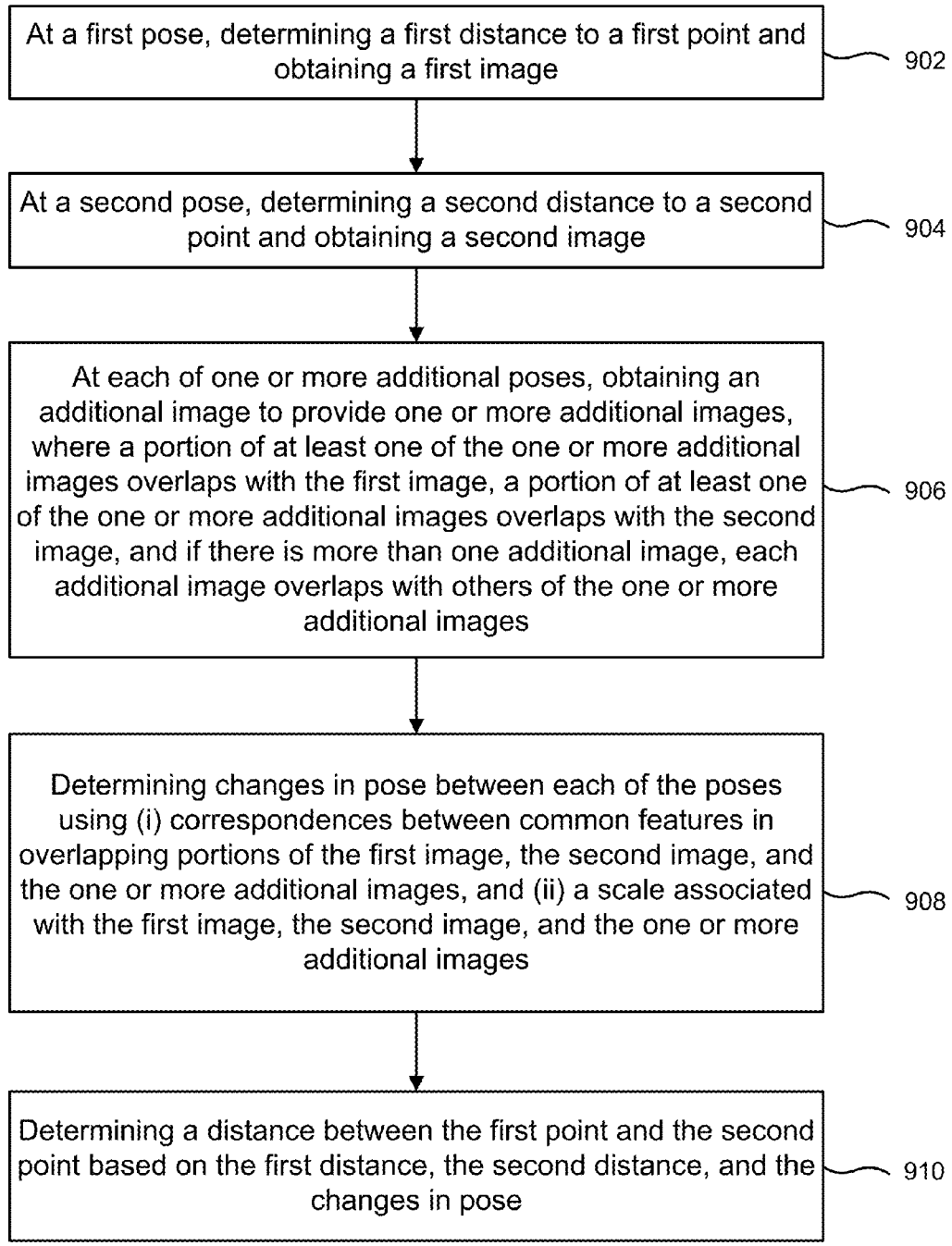

FIG. 9 is a flowchart providing a method for performing point-to-point measurements in accordance another embodiment. At a first pose, a first distance to a first point is determined and a first image is obtained (902). At a second pose, a second distance to a second point is determined and a second image is obtained (904). From each of one or more additional poses, an additional image is obtained to provide one or more additional images, where a portion of at least one of the one or more additional images overlaps with the first image, a portion of at least one of the one or more additional images overlaps with the second image, and if there is more than one additional image, each additional image overlaps with others of the one or more additional images (906). Changes in pose between each of the poses is determined using (i) observed changes between common features in overlapping portions of the first image, the second image, and the one or more additional images, and (ii) a scale associated with the first image, the second image, and the one or more additional images (908). A distance between the first point and the second point is determined based on the first distance, the second distance, and the changes in pose (910).

It should be appreciated that the specific steps illustrated in FIGS. 8-9 provide particular methods according to some embodiments. Other sequences of steps may also be performed according to alternative embodiments. For example, alternative embodiments may perform the steps outlined above in a different order. Moreover, the individual steps illustrated in FIGS. 8-9 may include multiple sub-steps that may be performed in various sequences. Furthermore, additional steps may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for performing point-to-point measurements, the method comprising:
at a first pose:
determining a first distance to a first point using a distance measurement device; and
obtaining a first image using an imaging device, wherein:
the first distance is determined concurrently with obtaining the first image such that measurement time is reduced compared to sequentially taking a measurement and a picture; and
the first image does not include the first point;
at a second pose:
determining a second distance to a second point using the distance measurement device, where the second point is different from the first point; and
obtaining a second image using the imaging device, wherein:
the first image and the second image having an overlapping portion;
the second distance is determined concurrently with obtaining the second image; and
the second image does not include the second point;
determining a change in pose of the imaging device between the first pose and the second pose using:
observed changes between common features in the overlapping portion of the first image and the second image; and
a scale associated with the first image and the second image to determine units of distance for translation between the first pose and the second pose; and
determining a distance between the first point and the second point based on the first distance, the second distance, and the change in pose of the imaging device between the first pose and the second pose.

2. The method of claim 1 wherein at least one of the first image or the second image includes an object of known size that is used to resolve the scale.

3. The method of claim 1 further comprising:
determining a distance to a point that is captured in at least one of the first image or the second image; and
resolving the scale using the distance to the point.

4. The method of claim 1 further comprising:
projecting a known pattern of light onto an object that is captured in at least one of the first image or the second image;
determining a distance to the object using the known pattern of light in at least one of the first image or the second image; and
resolving the scale using the distance to the object.

5. The method of claim 1 wherein the imaging device is a depth camera, the method further comprising:
determining a distance to an object that is captured in at least one of the first image or the second image using the depth camera; and
resolving the scale using the distance to the object.

6. The method of claim 1 further comprising:
determining a distance to an object that is captured in at least one of the first image or the second image using a location of focused radiation on the object and a known relationship between a field of view of the imaging device and the location of the focused radiation in the first image or the second image; and
resolving the scale using the distance to the object.

7. The method of claim 1 further comprising:
from a third pose:
determining a third distance to a third point using the distance measurement device, the third point located on a line extending between the first point and the second point; and
obtaining a third image using the imaging device, where the first image, the second image, and the third image have overlapping portions;
resolving the scale using observed changes between common features in the overlapping portions of the images and the first distance, the second distance, and the third distance.

8. The method of claim 1 wherein a location of the first pose is different from a location of the second pose.

9. An apparatus for performing point-to-point measurements, comprising:
a distance measurement device configured to acquire distance information;
an imaging device configured to acquire image information concurrently with the distance measurement device acquiring distance information such that measurement time is reduced compared to sequentially taking a measurement and a picture; and
a processor configured to:
receive the distance information, the distance information including a first distance to a first point obtained at a first pose and a second distance to a second point obtained at a second pose;

receive the image information, the image information including a first image obtained at the first pose and a second image obtained at the second pose, wherein:

the first image and the second image have an overlapping portion;

the first distance is determined concurrently with obtaining the first image;

the first image does not include the first point;

the second distance is determined concurrently with obtaining the second image; and the second image does not include the second point;

determine a change in pose of the imaging device between the first pose and the second pose using:

observed changes between common features in the overlapping portion of the first image and the second image; and a scale associated with the first image and the second image to determine units of distance for translation between the first pose and the second pose; and determine a distance between the first point and the second point based on the first distance, the second distance, and the change in pose of the imaging device between the first pose and the second pose.

10. The apparatus of claim 9 wherein the distance measurement device is an electronic distance meter (EDM).

11. The apparatus of claim 9 wherein the imaging device is a digital camera.

12. The apparatus of claim 9 wherein a location of the first pose is different from a location of the second pose.

13. The apparatus of claim 9 wherein:

the distance measurement device is further configured to determine a distance to a point that is captured in at least one of the first image or the second image; and the processor is configured to resolve scale using the distance to the point that is captured in at least one of the first image or the second image.

14. The apparatus of claim 9 wherein:

the image information further includes a third image obtained at a third pose; and the processor is further configured to determine a change in pose between the second pose and the third pose.

* * * * *